United States Patent
Carlson et al.

[11] Patent Number: 5,892,897
[45] Date of Patent: Apr. 6, 1999

[54] METHOD AND APPARATUS FOR MICROPROCESSOR DEBUGGING

[75] Inventors: Matthew L. Carlson, Kyle; Bruce A. Parker, Austin, both of Tex.

[73] Assignee: Motorola, Inc., Schaumburg, Ill.

[21] Appl. No.: 795,581

[22] Filed: Feb. 5, 1997

[51] Int. Cl.⁶ .................................................. G06F 11/00
[52] U.S. Cl. .............................. 395/183.13; 395/183.17; 395/183.07; 371/25.1
[58] Field of Search ...................... 395/183.13, 183.01, 395/183.06, 183.02, 184.01, 183.16, 183.17, 185.04; 371/22.1, 25.1, 27.5, 67.1

[56] References Cited

U.S. PATENT DOCUMENTS

| | | | |
|---|---|---|---|
| 4,176,258 | 11/1979 | Jackson | 235/302 |
| 4,482,953 | 11/1984 | Burke | 364/200 |
| 4,849,979 | 7/1989 | Maccianti et al. | 395/183.17 |
| 5,054,026 | 10/1991 | Tsubota | 371/68.3 |
| 5,136,595 | 8/1992 | Kimura | 371/68.3 |
| 5,157,780 | 10/1992 | Stewart et al. | 395/183.07 |
| 5,243,607 | 9/1993 | Masson et al. | 395/182.09 |
| 5,253,255 | 10/1993 | Carbine | 371/22.6 |
| 5,257,269 | 10/1993 | Hamauchi | 371/29.5 |
| 5,434,997 | 7/1995 | Landry et al. | 395/183.07 |
| 5,435,000 | 7/1995 | Boothroyd et al. | 395/183.07 |
| 5,452,443 | 9/1995 | Oyamada et al. | 395/183.07 |
| 5,600,784 | 2/1997 | Bissett et al. | 395/182.1 |

OTHER PUBLICATIONS

Cin et al., "Error Detection mechanism for massively parallel multiprocessors", IEEE, pp. 401–408, 1992.

Primary Examiner—Joseph Palys
Attorney, Agent, or Firm—Craig J. Yudell

[57] ABSTRACT

A trailer microprocessor in a debugging tool runs code a known number of cycles behind a master and shadow pair of processors. A pipeline queues up bus activity from the shadow processor a number of cycles, and then outputs those signals to the trailer microprocessor to execute the same code and signals as the master and shadow microprocessors a known number of cycles behind. The outputs of the master and shadow microprocessors are compared and the trailer microprocessor is halted, along with the master and shadow, when a "mismatch" occurs between the outputs of the master and shadow processors. When the internal states of all three processors are scanned, the differences in the internal state of the shadow processor before and at a failure can be theoretically compared. The trailer microprocessor may be stepped cycle-by-cycle up to and past the point of failure of the shadow processor for further analysis.

16 Claims, 2 Drawing Sheets

METHOD AND APPARATUS FOR MICROPROCESSOR DEBUGGING

FIELD OF THE INVENTION

The present invention relates in general to a method and apparatus for debugging a microprocessor, and in particular to a method and apparatus for debugging a microprocessor having infrequent or non-deterministic failures.

BACKGROUND OF THE INVENTION

Failures of a microprocessor device that occur during execution of code in the microprocessor under certain operating conditions must be discovered and analyzed during the development of that microprocessor so that the "bugs" in that microprocessor causing the failure can be corrected. The most difficult failures to track and solve are those that are "non-deterministic" and those that occur infrequently. A non-deterministic or infrequent failure must be verified and then analyzed to determine if it is a circuit characteristic, noise, or speed-path originating bug, for example.

A non-deterministic failure occurs randomly or pseudo-randomly and is difficult to identify as being caused by a specific circuit in the microprocessor. Often, non-deterministic type failures occur as chip operating temperatures or supply voltage levels are varied. Infrequently occurring failures are somewhat consistent, but do not exhibit themselves frequently during the execution of the code. Infrequent failures are often characterized by only occurring in specific applications such as booting operating systems or during the execution of a specialized software program, and they cannot be reproduced by using a simpler program or test vector. Also, these failures can occur thousands or even millions of instructions into the program, making it difficult to determine where in the program the failure occurred.

When performing a "debug" process of verifying and analyzing a failure, it would be desirable to analyze the internal state of the microprocessor not only at the point of the failure, but also at various times prior to that failure in order to understand the operation of the microprocessor leading up to the failure. However, in cases where the failures of interest are non-deterministic and infrequent, a significant amount of time may be required to place the microprocessor under test in the proper conditions to repeat the failure of interest. Similarly, many millions of lines of code may have to be executed in the microprocessor to reach the appropriate conditions or states of the processor to reach the infrequent failure. Because of these difficulties, debugging tools known in the art provide the internal state of the microprocessor at the point of failure, but the conditions of the processor leading up to the failure cannot be discerned from the provided data. Thus, to discover the state of the processor prior to the failure, the process is normally repeated and the processor halted prior to the failure. This, however, is generally impossible when the types of failures being considered are difficult to reproduce in a predictable way such as with non-deterministic and infrequently occurring failures. As can be seen, debugging tools in the prior art are not useful in providing important information about the operation of the processor leading up to the failure; yet, this information is critical for analyzing non-deterministic and infrequent failures and correcting bugs.

DESCRIPTION OF A PREFERRED EMBODIMENT

A trailer microprocessor in the debug tool of the present invention runs code a known number of cycles behind a master and shadow pair of processors. A pipeline queues up bus activity from the shadow processor a number of cycles, and then outputs those signals to the trailer microprocessor to execute the same code and signals as the master and shadow microprocessors a known number of cycles behind. The outputs of the master and shadow microprocessors are compared and the trailer microprocessor is halted, along with the master and shadow, when a "mismatch" occurs between the outputs of the master and shadow processors. This halts the trailer microprocessor a known number of cycles before the fault condition occurred in the shadow processor. When the internal states of all three processors are scanned, the differences in the internal state of the shadow processor before and at a failure can be theoretically compared. Thereafter, the trailer microprocessor may be stepped cycle-by-cycle up to and past the point of failure of the shadow processor for further analysis.

Figure 1:
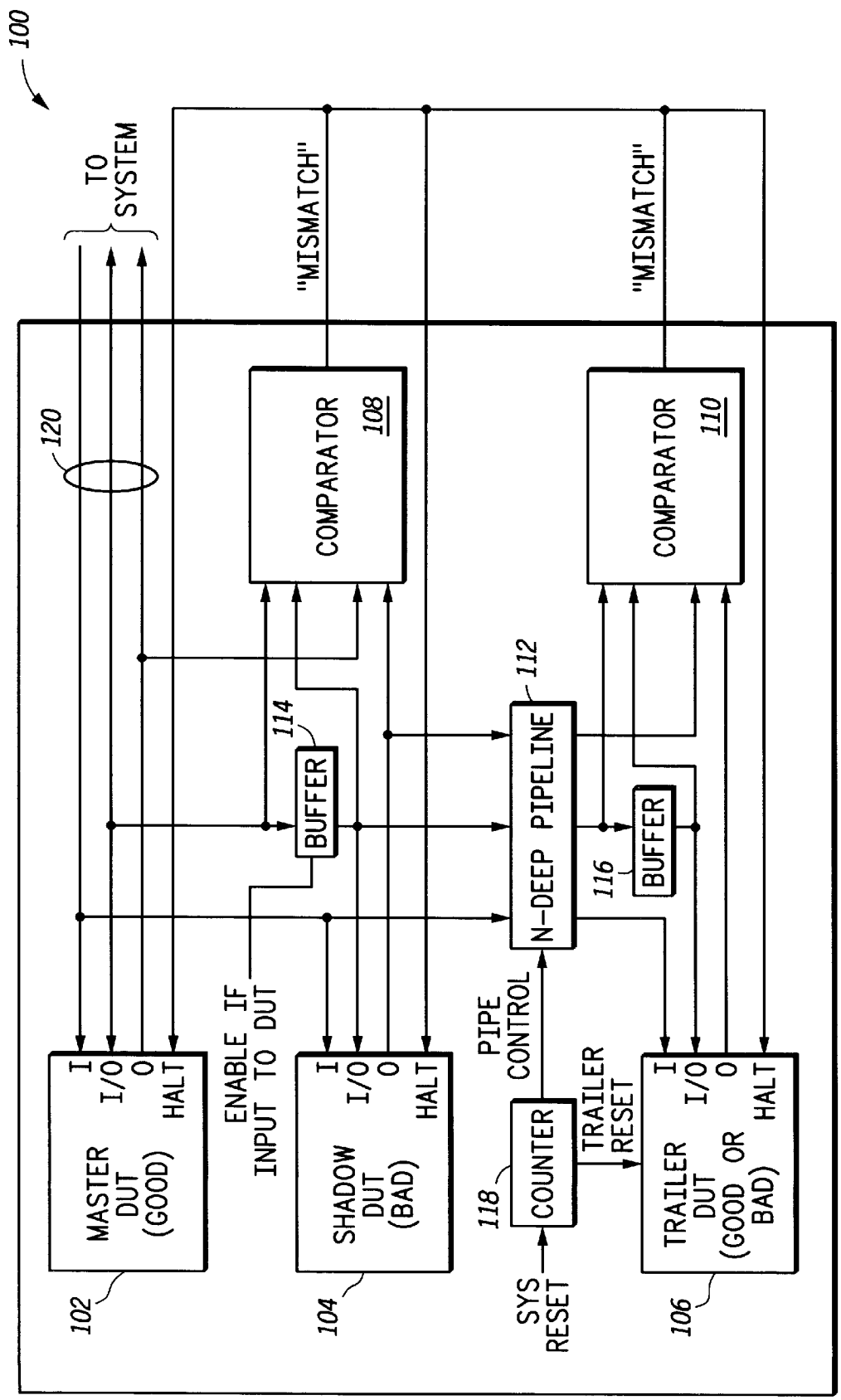
FIG. 1 is a schematic block diagram of a microprocessor debugging tool, in accordance with the preferred embodiment of the present invention.

With reference now to the figures, and in particular with reference to FIG. 1, there is shown a schematic block diagram of a microprocessor debugging tool, in accordance with the preferred embodiment of the present invention. Microprocessor debug tool 100 includes a master device under test (MASTER DUT 102), which is a microprocessor configured under conditions that are known to not result in a particular non-deterministic or infrequently occurring failure of interest ("good"). Microprocessor debug tool 100 further includes a shadow device under test (SHADOW DUT 104), which is a microprocessor configured under conditions that are known to generate a non-deterministic or infrequently occurring failure in the microprocessor ("bad"). Microprocessor debug tool 100 also includes a trailer device under test (TRAILER DUT 106), which is a microprocessor configured either under the conditions of the MASTER DUT, the SHADOW DUT, or some other selected conditions. All three microprocessors 102, 104 and 106 are preferably of the same type or execute common object code instructions.

Microprocessor debug tool 100 is connected to a system (not shown) that provides data, control and instructions over buses 120. Buses 120 connect to input and output ports of MASTER DUT 102 and input ports of SHADOW DUT 104. Outputs from MASTER DUT 102 and SHADOW DUT 104 are input into comparator 108, such that corresponding outputs from each microprocessor are compared by comparator 108. Buffer 114 directs signals from the system on buses 120 to SHADOW DUT 104, but prevents outputs from SHADOW DUT 104 from driving onto buses 120. Comparator 108 compares corresponding output signals of MASTER DUT 102 and SHADOW DUT 104 and generates a "mismatch" signal indicating a failure (i.e. a non-deterministic or infrequent failure has occurred in SHADOW DUT and has resulted in the outputs of the "good" and the "bad" processors to be different). This mismatch signal is connected to the halt input of each of the microprocessors MASTER DUT 102, SHADOW DUT 104 and TRAILER DUT 106. A signal at the halt input of the microprocessors 102, 104 and 106 forces the devices to halt execution of their instructions and freeze the internal state of the device circuitry (i.e. registers, logic, nodes, cache, etc.).

Microprocessor debug tool 100 further includes a N-deep pipeline 112, buffer 116, and counter 118. Counter 118 is pre-programmed to count a period equal to the number of clock cycles that TRAILER DUT 106 is to execute behind MASTER DUT 102. Counter 118 receives a system reset signal (SYS RESET) indicating when MASTER DUT 102 and SHADOW DUT 104 have begun execution of the set of instructions received from the system, and begins decrementing from the pre-programmed value upon receipt of the system reset signal. The instructions being sent to the MASTER DUT and the SHADOW DUT are also received and loaded into N-deep pipeline 112 over buses 120 (either from SHADOW DUT 104 as shown, or from the system). These instructions continue to be loaded into the N-deep pipeline until a PIPE CONTROL signal is received from counter 118. When counter 118 reaches the end of its count, it sends a PIPE CONTROL signal to N-deep pipeline 112 and a TRAILER RESET signal to TRAILER DUT 106. N-deep pipeline 112 then begins shifting instructions that have been loaded into the pipeline during the period that the counter was decrementing out to the TRAILER DUT 106 in a FIFO (first-in-first-out) manner. In this way, the counter controls the depth of the pipeline. The TRAILER RESET signal received by TRAILER DUT 106 enables the microprocessor to begin executing the instructions received from N-deep pipeline 112. Therefore, as will be appreciated, N-deep pipeline 112 and counter 118 operate together to delay the stream of instructions executed by MASTER DUT 102 and SHADOW DUT 104 by a preprogrammed period such that TRAILER DUT 106 is executing the identical code in a time-shifted manner. In other words, TRAILER DUT 106 is executing the same code a number of cycles behind the MASTER and SHADOW DUTs.

Microprocessor debug tool 100 also has an error checking circuit that includes comparator 110 and buffer 116. The output signals of SHADOW DUT 104 that have been stacked in pipeline 112 are compared with the outputs of TRAILER DUT 106 by comparator 110. Comparator 110 produces a "mismatch" or failure signal when these outputs of SHADOW DUT and TRAILER DUT are different. Because instructions, data, and/or conditions input into pipeline 112 from SHADOW DUT 104 are presumed to be correct (since a failure has not halted the processors), the execution of those same instructions in TRAILER DUT 106 should produce identical outputs. Therefore, comparator 110 ensures that TRAILER DUT 106 has not itself been the subject of a failure prior to the expected non-deterministic or infrequently occurring failure of interest in SHADOW DUT 104. Similar to buffer 114, buffer 116 prevents outputs from the TRAILER DUT from driving the bus output of pipeline 112.

In operation, microprocessor debug tool 100 would be used to debug a microprocessor having a non-deterministic or infrequent failure occurring under known conditions of the microprocessor. For example, a bug in the microprocessor may manifest itself under certain temperature or operating voltage conditions. MASTER DUT 102 is configured in microprocessor debug tool 100 under the conditions known not to produce the non-deterministic or infrequently occurring failure. SHADOW DUT 104 is configured in the microprocessor debug tool 100 under conditions that are known to produce the failure. The third microprocessor, TRAILER DUT 106 (preferably identical to the master and shadow) is configured in microprocessor debug tool 100 under selected conditions. Depending on the particular debug application, the selected conditions are known not to produce the failure, or are known to produce the failure. This enables the TRAILER DUT 106 to track the executing conditions c)f either the MASTER DUT 102 or the SHADOW DUT 104.

A set of instructions is provided by the system to the microprocessor debug tool 100 via buses 120. These instructions are executed by MASTER DUT 102 and SHADOW DUT 104 simultaneously in "lock-step" with each other based on a system clock. When the non-deterministic or infrequently occurring failure occurs, a mismatch signal will be produced by comparator 108 because the output conditions and signals from each of the microprocessors 102 and 104 will be different.

Because SHADOW DUT 104 has been placed in the known faulting condition, at some point within the execution of the set of instructions the non-deterministic or infrequently occurring failure will occur, causing a mismatch output at comparator 108. This output will then halt the execution of instructions in all three microprocessors 102, 104 and 106. The internal state of any or all of the three processors may then be scanned out for analysis. For example, any IEEE 1149.1 JTAG interface can be used for scanning the internal state of the microprocessors.

Figure 2:
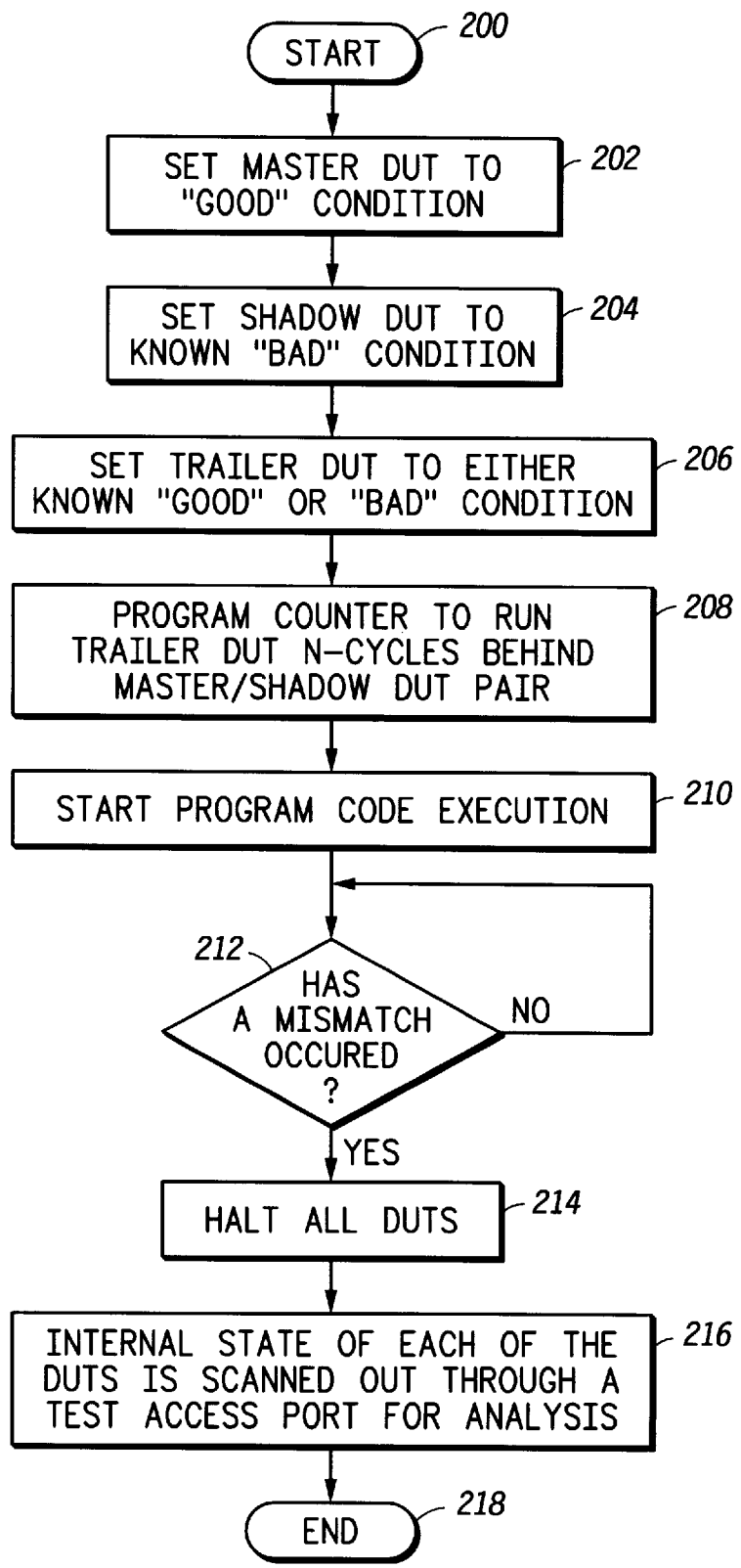
FIG. 2 is a logic flow diagram of a method for debugging a microprocessor, in accordance with the preferred embodiment of the present invention.

With reference now to FIG. 2, there is shown a logic flow diagram of a method for debugging a microprocessor, in accordance with the preferred embodiment of the present invention. The debugging process begins (200) by setting (configuring) the MASTER DUT to a "good" condition (202), such as setting it in a temperature or operating voltage known not to produce a non-deterministic or infrequently occurring failure, and setting the SHADOW DUT to a known "bad" condition (204), such that the microprocessor is placed in a temperature or operating voltage condition or environment that is known to produce a non-deterministic or infrequently occurring failure. The process proceeds by configuring (206) the TRAILER DUT to either a known "good" or "bad" condition, depending upon a particular debugging application (embodiment). Counter of microprocessor debug tool 100 is programmed (208) with a count value that will set the TRAILER processor's execution a predetermined number of cycles behind the MASTER and SHADOW microprocessors. The program code is then executed (210) on MASTER DUT 102 and SHADOW DUT 104 in lock-step (concurrent execution) with each other (based on a system clock). Also at step 210, the program code is loaded into the pipeline 112 to then be transferred to TRAILER DUT for execution N-cycles later, wherein the number of cycles that TRAILER DUT 106 is delayed is set by the value entered in counter 118. The process then determines (212) if a mismatch has occurred between the outputs of MASTER DUT 102 and SHADOW DUT 104. Program code continues to execute on all three processors until a determination is made that a mismatch has occurred. At that point, all three devices under test are halted and their internal states are frozen (214). At step 216, the internal state of each of the microprocessors under test is scanned out through a test access port for analysis, and thereafter the process ends (218).

It will now be appreciated that the present invention provides a method and apparatus for microprocessor failure analysis and debug of non-deterministic and infrequent type failures that efficiently and quickly pinpoints the conditions and state of the microprocessor both before and at the point of failure. While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A device debugging apparatus comprising:
   a master device under test that executes a set of instructions, wherein the master device under test is configured under conditions that do not result in a first failure;
   a shadow device under test that executes the set of instructions concurrently with the master device under test, wherein the shadow device under test is configured under conditions that do result in the first failure;
   a trailer device under test that executes each instruction of the set of instructions a predetermined period after that instruction is executed by the master device under test; and
   an error checking circuit connected to the shadow device under test that determines when the first failure occurs and halts the execution of the trailer device under test.

2. The device debugging apparatus of claim 1, further wherein the error checking circuit halts execution of the master device under test and the shadow device under test when it is determined that the first failure occurred.

3. The device debugging apparatus of claim 1, further wherein the error checking circuit includes a comparator connected to outputs of the master and shadow devices under test, wherein a comparison of the outputs indicates when the first failure occurs.

4. The device debugging apparatus of claim 3, further wherein the comparator generates a failure signal when a comparison indicates the first failure, and wherein the failure signal is connected to the trailer device under test such that the failure signal halts the execution of instructions by the trailer device.

5. The device debugging apparatus of claim 1, wherein the predetermined period is a number of clock cycles of a system clock provided for timing at least the trailer device under test.

6. The device debugging apparatus of claim 1, wherein the master device under test receives each instruction of the set of instructions prior to executing the instruction, further wherein the device debugging apparatus includes a pipeline that receives each instruction of the set of instructions as it is received by the master device under test and outputs each instruction a number of clock cycles later, wherein the number of clock cycles corresponds to the predetermined period.

7. The device debugging apparatus of claim 6, wherein the device debugging apparatus further includes a counter connected to the pipeline, wherein the counter controls the depth of the pipeline.

8. The device debugging apparatus of claim 7, wherein the counter is programmed such that the counter initiates the trailer device under test to begin executing the set of instructions after the predetermined period.

9. The device debugging apparatus of claim 1, wherein the trailer device under test is configured under conditions that do not result in the first failure.

10. The device debugging apparatus of claim 1, wherein the trailer device under test is a processor.

11. A method of debugging a device, comprising the steps of:
    configuring a master device in a condition that does not result in a first failure;
    configuring a shadow device in a condition that does result in a first failure;
    configuring a trailer device to execute a set of instructions a predetermined period after the set of instructions is executed on the master device;
    executing the set of instructions by both the master device and the shadow device;
    executing the set of instructions by the trailer device the predetermined period after execution by the master device;
    determining when the first failure occurs; and
    halting execution of the set of instructions on the trailer device when the first failure is determined.

12. The method of claim 11, further comprising the step of analyzing an internal state of the trailer device when the trailer device is halted.

13. The method of claim 11, wherein the step of determining when the first failure occurs includes determining if a mismatch in outputs of the master device and shadow device occurs.

14. The method of claim 11, further comprising the step of configuring the trailer device in a condition that does not result in a first failure.

15. The method of claim 11, wherein the step of configuring the trailer device includes programming a counter to count the predetermined period.

16. The method of claim 11, wherein the step of executing the set of instructions by the trailer device includes storing each instruction of the set of instructions in a pipeline and outputting each stored instruction to the trailer device after the predetermined period.

* * * * *